US011912046B2

(12) United States Patent
Canales et al.

(10) Patent No.: US 11,912,046 B2
(45) Date of Patent: Feb. 27, 2024

(54) PLATEN FOR DIRECT DIGITAL PRINTING ONTO A SHOE

(71) Applicant: Creators Equity LLC, Cheyenne, WY (US)

(72) Inventors: Said Canales, Irvine, CA (US); Victor Pena, Irvine, CA (US)

( * ) Notice: Subject to any disclaimer, the term of this patent is extended or adjusted under 35 U.S.C. 154(b) by 0 days.

(21) Appl. No.: 18/170,466

(22) Filed: Feb. 16, 2023

(65) Prior Publication Data

US 2023/0202201 A1 Jun. 29, 2023

Related U.S. Application Data

(62) Division of application No. 17/159,031, filed on Jan. 26, 2021, now Pat. No. 11,607,892.

(51) Int. Cl.
*B41J 3/407* (2006.01)
*A43D 8/00* (2006.01)
*A43D 8/22* (2006.01)
*B41J 11/14* (2006.01)

(52) U.S. Cl.
CPC .......... *B41J 3/40731* (2020.08); *A43D 8/003* (2013.01); *A43D 8/22* (2013.01); *B41J 11/14* (2013.01)

(58) Field of Classification Search
CPC ......... B41J 3/40731; A43D 8/003; A43D 8/22
See application file for complete search history.

(56) References Cited

U.S. PATENT DOCUMENTS 9,301,576 B2 4/2016 Miller et al.
9,635,907 B2 5/2017 Romero et al.
10,343,394 B2 7/2019 Leedy
10,433,618 B2 10/2019 Kamakeeaina et al.
2013/0014330 A1* 1/2013 Romero .................. A43D 8/22 12/142 R
2014/0310892 A1* 10/2014 Miller .................. A43B 3/0084 12/146 C
2017/0112238 A1* 4/2017 Cooke ...................... A43D 8/22

FOREIGN PATENT DOCUMENTS

CN 211518947 9/2020
CN 211518947 U * 9/2020

OTHER PUBLICATIONS

Why Print Custom Footwear, catalog, 2012 http://garmenttools.com/shoe-platen/.
Lawson Shoe Platen for the Epson F2100 & F2000 Dtg. Catalog. Jan. 27, 2021 Saint Louis MO, 63115 United States https://estore.lawsonsp.com/products/epson-f2100-f2000-shoe-platen.

* cited by examiner

*Primary Examiner* — Justin Seo
*Assistant Examiner* — Kendrick X Liu
(74) *Attorney, Agent, or Firm* — CIONCA IP Law P.C.

(57) ABSTRACT

A system for stretching a surface of a shoe for digitally printing onto the surface by an external device, the system comprising an apparatus and a controller in electrical communication, the system having: a main plate to receive and support the shoe; a side arm to traverse longitudinally along an edge of a medial portion of the main plate and to engage with at least a portion of the tongue of the shoe; and a driver causing the longitudinal traversal of the side arm, having: an end bearing and an end connector; a rotary band; an end bracket opposite the end bearing and beneath the main plate; a driving screw between the end bracket and the end bearing, and associated with the side arm; and a motor adapted to receive an electrical signal from the controller selectively causing a rotation of a rotary shaft of the motor.

7 Claims, 8 Drawing Sheets

PLATEN FOR DIRECT DIGITAL PRINTING ONTO A SHOE

CROSS-REFERENCE TO RELATED APPLICATIONS

This application is a divisional of and claims the benefit of U.S. Non-Provisional application Ser. No. 17/159,031, filed Jan. 26, 2021, which is hereby incorporated by reference, to the extent that it is not conflicting with the present application.

BACKGROUND OF INVENTION

1. Field of the Invention

The invention relates generally to apparatuses for stretching a surface of a shoe, and more specifically to electronic shoe platens for stretching a surface of a canvas shoe for digital printing onto said surface of the shoe.

2. Description of the Related Art

Currently, few solutions exist that allow a user, such as a user in a retail, commercial, or household setting, for example, to digitally print directly onto an already-existing canvas shoe using a digital garment printer. It may be desired in various situations to digitally print a logo, design, color pattern, and similar graphics onto a surface of a canvas shoe for the customization, branding and/or personalization of the canvas shoe, as an example. While numerous methods and apparatuses exist for digitally printing onto shoe surfaces during the manufacturing process, due to the already flat state of the garment (i.e., portion of the shoe before assembly), digitally printing onto an already-existing canvas shoe (e.g., a Converse® shoe) may be particularly difficult due to the naturally curved surfaces of the canvas shoe, for example.

Most conventionally, an apparatus such as a shoe platen may be used to facilitate stretching of a surface of a canvas shoe (e.g., the side surface of the shoe) to thus allow printing onto the surface. These shoe platens may each comprise a main plate having protrusions/arms and/or grooves for slidably engaging an interior of a shoe, such that a shoe placed on either side of the main plate may be printed on. However, significant drawbacks of these shoe platens may be the lack of top support and the inability to accommodate various shoe sizes without having to replace a particular shoe platen with a second larger or smaller shoe platen, and/or without having to add or remove additional components (e.g., adjusters or brackets). As such, it may be necessary to purchase and have available multiple shoe platens of varying size, which may be costly and thus inefficient. Furthermore, with regard to the shoe platens having removable size adjustment means (e.g., brackets and heel plates) for accommodating shoes of various sizes, the addition or removal and adjustment of said means must be done manually by the user prior to printing, by loosening and tightening of nuts and bolts or pegs before and after manually adjusting a position of the brackets or heel plates, for example, which may be time-consuming and thus inefficient.

Therefore, there is a need to solve the problems described above by providing a device and method for cost-effectively and time-efficiently stretching a surface of a canvas shoe for digitally printing onto the surface using a garment printer.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an apparatus for stretching a surface of a pair of shoes for digitally printing onto each surface by an external device is provided. The apparatus may comprise: a main plate configured to receive and provide support for the pair of shoes, the main plate comprising a front end, a rear end opposite the front end, and a medial portion extending between the front and the rear ends, the medial portion being laterally offset from an outer edge of each of the front and the rear ends, a pair of curved grooves disposed at the rear end, the pair of curved grooves each being adapted to receive and provide support for an interior of the heel of each shoe of the pair of shoes, a pair of side arms associated with the main plate, each side arm of the pair of side arms being adapted to traverse longitudinally along an edge of the medial portion, each side arm having a hook adapted to engage with at least a portion of the tongue of each shoe; and a pair of motors associated with the main plate, the pair of motors each being configured to independently cause a longitudinal movement of one of the pair of side arms; wherein each motor of the pair of motors is adapted to receive an electrical signal from an external controller, the electrical signal selectively causing a rotation of a rotary shaft of each motor; and the main plate being thus configured such that when each shoe of the pair of shoes is received by the main plate, and when the electrical signal is received by each motor, the pair of side arms are caused to traverse longitudinally, each hook engaging with at least a portion of the tongue of each shoe and each curved groove opposing an interior of the heel of each shoe, such that to cause a stretching of a surface of each shoe, and thus enabling direct digital printing onto each surface by the external device. Thus, an advantage of the shape of the main plate is the ability to securely fit a canvas shoe on either side of the main plate, thus negating the need for additional exterior components. An additional advantage is that the electronic shoe platen enables the simultaneous stretching and flattening of a pair of canvas shoes, such that graphics may be printed simultaneously onto the pair of canvas shoes. An additional advantage is operating time efficiency due to the motorization of the shoe stretching process, which greatly reduces operating time associated with manually operating the shoe platen. Another advantage is that the pair of canvas shoes may be protected from damage or mistakes during the printing process, such as mistakes incurred due to a slipping of the shoe during the digital printing process.

In another aspect, a system for stretching a surface of a shoe for digitally printing onto the surface by an external device is provided. The system may comprise an apparatus and a controller being in electrical communication with the apparatus, the apparatus comprising: a main plate configured to receive and provide support for the shoe; a side arm associated with the main plate, the side arm being adapted to traverse longitudinally along an edge of a medial portion of the main plate and being configured to engage with at least a portion of the tongue of the shoe, and a driver configured to cause the longitudinal traversal of the side arm, the driver having an end bearing and an adjacent end connector disposed beneath the main plate, a rotary band attached to and extending between the end bearing and the end connector, an end bracket disposed opposite the end bearing and beneath the main plate, a driving screw extending between the end bracket and the end bearing, the driving screw being associated with the side arm, and a motor associated with the end connector, the motor being adapted to receive an electrical signal from the controller, the electrical signal selectively causing a rotation of a rotary shaft of the motor. Thus, an advantage of the shape of the main plate is the ability to securely fit a canvas shoe on the main plate, thus negating the need for additional exterior components. An additional advantage is operating time efficiency due to the motorization of the shoe stretching process, which greatly reduces operating time associated with manually operating the apparatus. Another advantage is that the shoe may be protected from damage or mistakes during the printing process, such as mistakes incurred due to a slipping of the shoes during the digital printing process. An additional advantage of the disclosed apparatus is that the controller may allow a user to intuitively and selectively control the various operations of the shoe platen.

In another aspect, a method of stretching a surface of a shoe for digitally printing onto the surface using an external device is provided. The method may comprise the steps of: receiving an apparatus configured to stretch the surface of the shoe and a controller being in electrical communication with the apparatus, the apparatus comprising a main plate adapted to receive and provide support to the shoe, the main plate having a curved groove disposed at a rear end of the main plate, a side arm associated with the main plate, the side arm being adapted to traverse longitudinally along a medial portion of the main plate, such that to engage at least a portion of the tongue of the shoe, and a motor adapted to receive an electrical signal from the controller, the electrical signal selectively causing a rotation of a rotary shaft of the motor; placing the shoe onto the main plate, such that an interior sole of the heel of the shoe abuts at least a portion of the curved groove, and such that at least a portion of the toe cap of the shoe abuts a front end of the main plate; and selectively operating the controller, such that to cause a transmitting of the electrical signal to the motor, the electrical signal selectively causing a rotation of the rotary shaft of the motor, and thus a longitudinal forward traversal of the side arm, the side arm engaging at least a portion of the tongue of the shoe, such that to stretch a surface of the shoe for subsequently digitally printing onto the surface using the external device. Thus, an advantage is operating time efficiency due to the motorization of the shoe stretching process, which greatly reduces operating time associated with manually operating the apparatus. An additional advantage is the user-friendly nature of the apparatus, due to the simplicity of the shoe stretching process using said apparatus. Another advantage is that the shoe may be protected from damage or mistakes during the printing process, such as mistakes incurred due to a slipping of the shoe during the digital printing process. An additional advantage of the disclosed shoe platen is that the controller may allow a user to intuitively and selectively control the various operations of the shoe platen.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
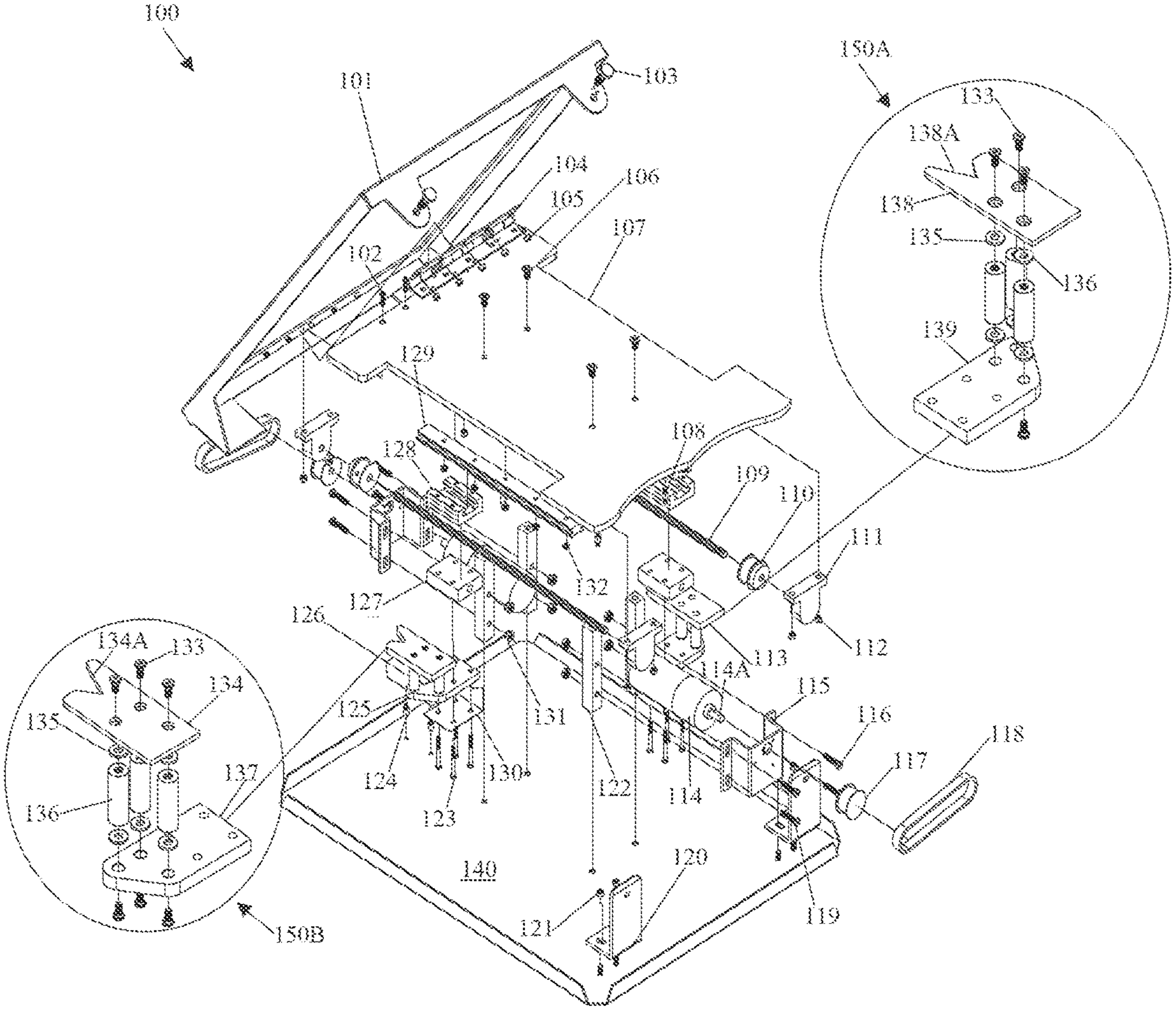
FIG. 1 illustrates an exploded perspective view of an electronic shoe platen, according to several aspects.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

For the following description, it can be assumed that most correspondingly labeled elements across the figures (e.g., 107 and 207, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates an exploded perspective view of an electronic shoe platen 100, according to several aspects. As will be described throughout this disclosure below, the electronic shoe platen ("electronic shoe platen," "shoe platen," "apparatus") 100 may enable the easy, effective, and efficient stretching of a side surface of an existing canvas shoe for digitally printing onto said side surface using any suitable digital garment printer. As shown in FIG. 1, the shoe platen 100 may comprise a plurality of exemplary mechanical and electrical components that, when fully and securely assembled together, form a single, compact, motor-driven apparatus. Thus, it should be understood that a portion of, or any combination of, the exemplary components illustrated in FIG. 1 may be replaced for other known, readily available parts that perform the same function, as will be described below, without veering outside the scope of the present invention.

As shown as an example, the electronic shoe platen 100 may comprise a main plate "plate," "bed," "body") 107 connected to a top frame 101 via a hinge 104. The hinge 104 may be connected between the top frame 101 and the plate 107 using any suitable means, such as screws 105 and 102, respectively, as shown. As shown by the close views at 150A and 150B, the electronic shoe platen 100 may further comprise a pair of side arms ("pair of side arms," "side arms," "right and left arms," "first and second arms") 134 and 138, respectively, as an example. As will be described in greater detail later below, the side arms 134 and 138 may be adapted to move/slide along either side/edge of the main plate 107, such that to facilitate stretching of a pair of canvas shoes, for example. As shown by 150A, the right arm 138 may have a hook groove ("hook groove," "hook," "V-shaped groove") 138A etched into the arm, as shown, the hook 138A being adapted to engage with an inner portion of a shoe, for example, as will be described in detail later. Additionally, the right arm 138 may be connected above a support base 139, as shown, via sets of top washers 135, coupling nuts 136, top screws 133, bottom washers 125, and bottom screws 124, as an example. The support base 139 may thus associate the right arm 138A with the right side of the plate 107, as indicated in FIG. 1. Similarly, as shown by 150B, the left arm 134 may have a hook groove 134A etched into the arm, as shown, the hook 134A being adapted to engage with an inner portion of a shoe, for example, as will also be described in detail later. Moreover, the left arm 134 may be connected above a support base 137, as shown, via sets of washers 135, coupling nuts 136, top screws 133, bottom washers 125, and bottom screws 124, as shown as an example. The support base 137 may thus associate the left arm 134A with the left side of the main plate 107, as indicated in FIG. 1.

As shown in FIG. 1, the electronic shoe platen 100 may further comprise a bottom base or platform 140 for providing upward support to the main plate 107 and a fastening surface for the plurality of components housed beneath the plate 107. As an example, the electronic shoe platen 100 may also be provided with a driving mechanism ("driving mechanism," "driver") for facilitating mechanical stretching of a canvas shoe. The driving mechanism may be provided on each side of the plate 107, and may comprise a 24 Volt DC motor 114 having a rotary shaft 114A, a driving screw/shaft 109, a driving block 127, a driving guide 128 and a driving rail 129. As shown, the driving rail 129 may be secured below the main plate 107 via screws/bolts 132, for example. As shown as an example, the driving screw 109 may be attached to an end bearing 110 and subsequently to an abutting end bracket 111, the end bracket 111 being connected to the main plate 107 above it via screws 112, for example. As an example, the driving mechanism may cause a moving/sliding of a side arm, which will be described in greater detail when referring to FIG. 2. It should be understood that each side arm 134, 138 may be provided with its own driving mechanism for causing a movement of the side arm, for example.

As shown in FIG. 1, the electronic shoe platen 100 may be provided with a number of supporting components and structures for facilitating the secure and effective operation of the apparatus. As shown, the bottom platform 140 may be provided with a pair of L brackets 120 secured to the platform 140 via screws 121, for example. The pair of L brackets 120 may provide an engagement means for pins 103 of the top frame 101, which will be discussed in more detail later in this disclosure. As shown, the bottom platform 140 may also comprise a set of vertical posts 122 configured to secure the main plate 107 above the platform 140 via top screws 106 and corresponding nuts 108, as an example. Additionally, as indicated in FIG. 1, the set of vertical posts 122 may be adapted to receive screws 116 and corresponding nuts 131 for securing a pair of bracket plates 115 to the vertical posts 122. As shown, each bracket plate 115, once attached to the vertical posts 122, may secure each DC motor 114 to an end connector 117, the end connector 117 being provided with a rotary band 118. As will be discussed in greater detail when referring to FIG. 2, the DC motor 114 may cause a rotation of the end connector 117, which may then cause a rotation of the rotary band 118. As an example, the rotary bands 118 may be constructed of any suitably elastic, durable, and frictional material, such as, for example, rubber, silicon, and the like. The bottom platform 140 may also be provided with sets of bottom bolts 123 attached to support plates 130 and support blocks 126, respectively, the support plates 130 and support blocks 126 being configured to secure and support the left and right arms 134 and 138. The importance and functionality of each of the various exemplary components of the electronic shoe platen briefly discussed above shall become apparent by the ensuing description herein below.

Figure 2:
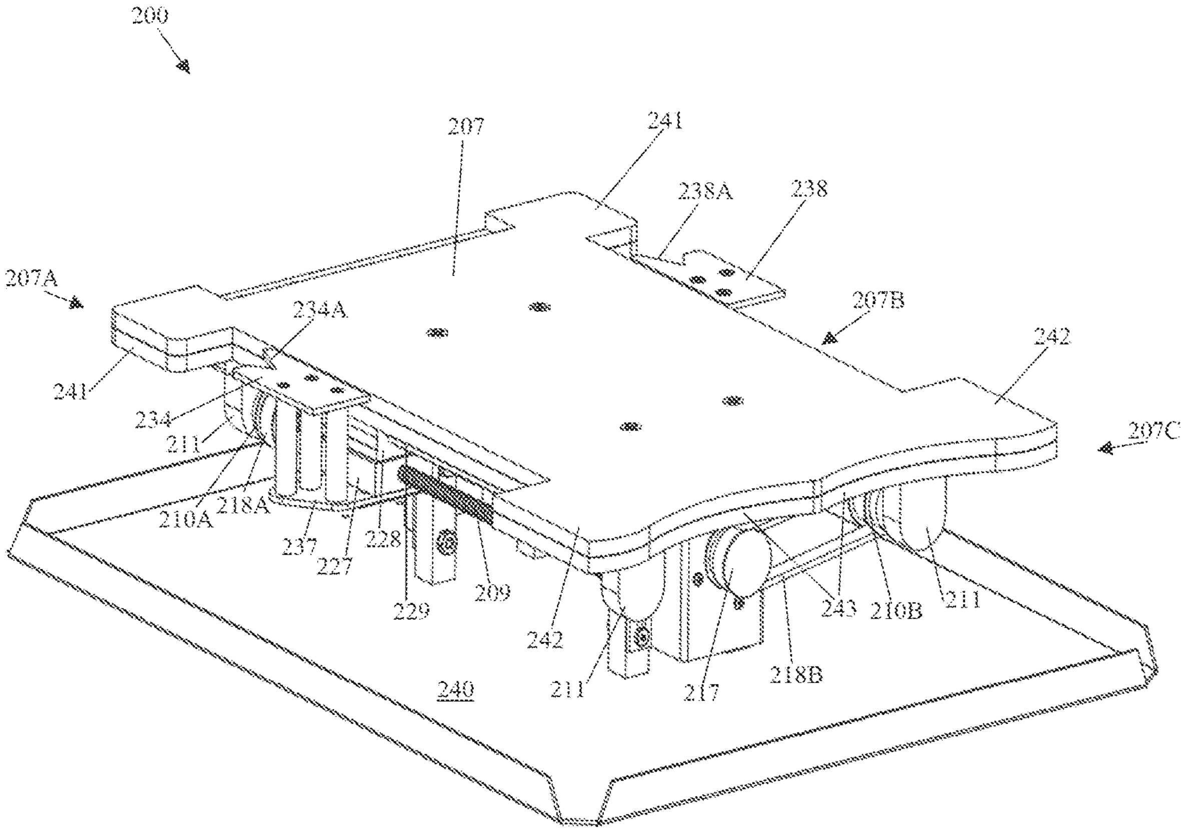
FIG. 2 illustrates a perspective view of the electronic shoe platen of FIG. 1, according to an aspect.

FIG. 2 illustrates a perspective view of the electronic shoe platen 100 of FIG. 1, according to an aspect. It should be understood that the top frame 101, hinge 104, and corresponding screws 102 and 105 have been omitted from this view for clarity. As shown, FIG. 2 depicts the electronic shoe platen 200, shown previously in FIG. 1, fully assembled. As such, it should be understood that numerous supporting components, particularly those components disposed beneath the main plate 207, may be absent from this view. As will be described in detail below, the electronic shoe platen 200 may enable the effective and efficient stretching, and thus flattening, of a surface of a canvas shoe.

As described previously above when referring to FIG. 1, the electronic shoe platen 200 may comprise a main plate 207 disposed above and securely associated with the bottom platform 240. As indicated, the main plate 200 may have a first end ("first end," "front end") 207A, a medial/middle portion 207B, and a second end ("second end," "rear end") 207C opposite the first end 207C. As shown, the plate 207 may comprise frontal rectangular blocks 241, each disposed at opposite edges of the first end 207A. As will be described in greater detail later in this disclosure, the frontal blocks 241 may provide an opposing surface against which to position an upper front portion (i.e., the toe cap) of a canvas shoe, as an example. As shown, the medial portion 207B may run linearly between, and may be offset laterally from, the first end 207A and the second end 207C. Finally, as shown, the main plate 207 may comprise rear blocks 242, each disposed at opposite edges of the second end 207C. The rear blocks 242 may each comprise an inward-facing curved groove 243 extending toward a midpoint of the second end 207C, as shown in FIG. 2. As will be described in greater detail later in the disclosure, the rear blocks 242 and corresponding curved grooves 243 may be configured to receive an interior portion (e.g., inner sole) of a heel of a canvas shoe. As discussed above, the main plate 200 may thus be specifically designed to accommodate the natural curvature of a top and an interior of the heel of a canvas shoe. Thus, an advantage of the shape of the main plate is the ability to securely fit a canvas shoe on either side of the main plate, thus negating the need for additional exterior components.

As described previously when referring to FIG. 1 above, the shoe platen 200 may comprise the first and second arms 234 and 238, each disposed at the medial portion 207B of the plate 207, respectively, such that to slide at least partially along an edge of the medial portion 207B. As also mentioned previously above, the shoe platen 200 may be provided with a pair of drivers each adapted to drive/slide one of the side arms 234 and 238, as an example. As discussed previously, each driver may comprise a 24V DC motor (114 in FIG. 1), a driving screw 209, a driving block 227, a driving guide 228 and a driving rail 229, shown assembled in FIG. 2. As shown, for each lengthwise side/half of the main plate 207, the driving screw 209 may be engaged/threaded through a center of the driving block 227, which may be connected above the support plate 237, as an example. As shown, the driving guide may be disposed above the driving block 227, the driving guide also being slidably engaged with the driving rail 229. Additionally, as shown in FIG. 2, and referring specifically to the left side of the shoe platen 200, the driving screw 209 may extend between an end bearing 210A and an end bracket 211, the end bracket 211 being disposed at the second end 207C. As shown, the end bearing 210A may be connected to an abutting end bracket 211 disposed at the first end 207A; a rotary band 218A may be disposed along an outer perimeter of the end bearing 210A, as an example.

Referring now to the right side of the shoe platen 200, a second driving screw (not shown) may extend between an end bracket (not shown) disposed at the first end 207A and an end bearing 210B. As similarly described above when referring to the left side, the end bearing 210B may be connected to an abutting end bracket 211 disposed at the second end 207C and may be provided with a rotary band 218B disposed along an outer perimeter of the end bearing 210B. As described previously above when referring to FIG. 1, the DC motors may each cause a driving of either the right arm 234 or the left arm 238, such that to stretch a surface of a canvas shoe. As an example, the DC motors may be disposed centrally beneath the main plate 207, such that they are not visible and thus protected from external potentially damaging factors (e.g., water or ink spills, dirt, etc.), for example, with each DC motor being connected to an end connector 217 (via their respective rotor shafts (114A in FIG. 1), for example). As shown, at the second end 207C, for example, the rotary band 218B may extend between and be disposed around the outer perimeters of the end connector 217 and the end bearing 210B. As an example, during operation, a first DC motor of the pair of DC motors connected to the end connector 217 may cause a rotation (either clockwise or counterclockwise) of the end connector 217, which, via the rotary band 218B, causes a same rotation of the end bearing 210B, for example. As the end bearing 210B is rotated, for example, the driving screw 209 is caused to rotate accordingly, such that the driving block 227 is traversed longitudinally (either forward or backward) and the driving guide 228 is traversed longitudinally along the driving rail 229, and thus, causing the right arm 238 to be traversed longitudinally in the same direction.

Accordingly, the same operation applies for the rotary band 218A disposed at the first end 207A. As an example, during operation, a second DC motor connected to the end connector (not shown) at the first end 207A may cause a rotation (either clockwise or counterclockwise) of the end connector, which, via the rotary band 218A, causes a same rotation of the end bearing 210A, for example. As the end bearing 210A is rotated, for example, the driving screw 209 is caused to rotate, such that the driving block 227 is traversed longitudinally (either forward or backward), and thus, causing the left arm 234 to be traversed longitudinally in the same direction. Thus, as outlined above, each DC motor of the pair of DC motors may individually cause and thus control the movement of one of the right and left arms 334 and 338. As will be described in more detail when referring to FIG. 6 below, the DC motors may be controlled electronically by a single controller electrically connected to the shoe platen 200, as an example.

Figure 5:
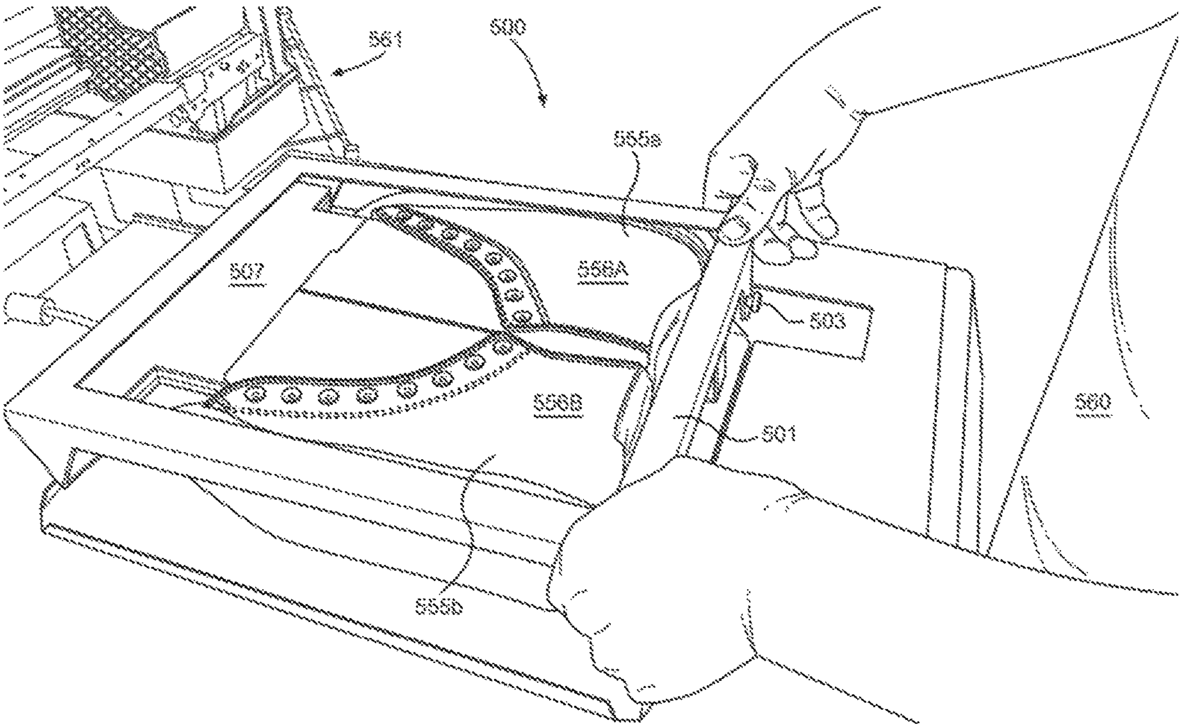
FIG. 5 illustrates a perspective view of an exemplary use of the electronic shoe platen of FIG. 1, in stretching an exemplary pair of canvas shoes, according to an aspect.

As mentioned throughout this disclosure above, the shoe platen 200 described herein may be used to facilitate stretching of a surface of a canvas shoe, such that said surface is tautly flattened for the digital printing process. Continuing the examples above, one canvas shoe or a pair of canvas shoes may be fitted onto the plate 207, such that the inner sole at the heel of one or both of the canvas shoes is fitted onto either or both of the rear blocks 242 at the second end 207C, accordingly. The toe cap of one or both of the canvas shoes may rest against either or both of the frontal blocks 241, accordingly. Assuming the laces of the canvas shoe(s) have been removed, the lowest portion of the tongue of the canvas shoe(s) may be inserted onto either or both of the side arms 234, 238, such that the tongue(s) engage with the either or both hooks 234A, 238A. As such, when the DC motor(s) causes a forward longitudinal motion of either or both side arms 234, 238, in the manner discussed above, the hook(s) 234A, 238A grips the lowest portion of the tongue(s) of the canvas shoe(s), which thus causes a stretching of the side surface of the canvas shoe(s). An example of this process is shown in FIG. 5 and will be discussed in more detail when referring to FIG. 5. As such, the shoe platen 200 may effectively accommodate, securely hold, and stretch a single canvas shoe or a pair of canvas shoes. Thus, an advantage is that the electronic shoe platen enables the simultaneous stretching and flattening of a pair of canvas shoes, such that graphics may be printed simultaneously onto the pair of canvas shoes. An additional advantage is operating time efficiency due to the motorization of the shoe stretching process, which greatly reduces operating time associated with manually operating the shoe platen. Another advantage is the ability to independently stretch each shoe of a pair of shoes placed on either side of the main plate.

Figure 3:
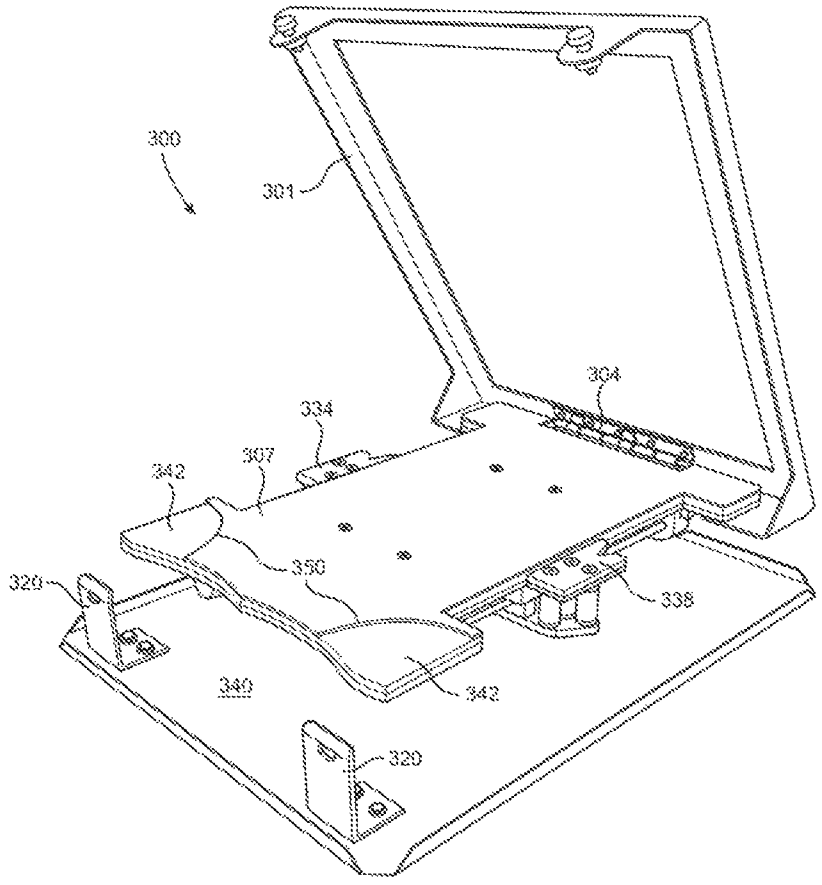
FIG. 3 illustrates a perspective view of the electronic shoe platen of FIG. 1, shown in an open state, according to an aspect.

FIG. 3 illustrates a perspective view of the electronic shoe platen 100 of FIG. 1, shown in an open state, according to an aspect. As shown in FIG. 3, the shoe platen 300 may comprise the top frame 301 connected to the main plate 307 via an exemplary hinge 304, for example. As shown, the top frame 301, when in an open state, may naturally and securely remain propped up, for example, such that to allow canvas shoes to be placed onto either side of the plate 307 for digital printing. The top frame 301 may thus be appropriately weighted (via its construction materials, for example) to allow the top frame 301 to freely remain opened, as shown.

As described previously throughout this disclosure above, the main plate 307 of the shoe platen 300 may comprise rear blocks 342 adapted to receive a sole of a heel of a canvas shoe. As shown in FIG. 3, the surface of each of the rear blocks 342 may comprise a quarter-circle shaped recess 350 disposed in the surface. The recesses 350 may be provided to accommodate high-topped canvas shoes, for example. As an example, the recess 350 of each rear block 342 may be configured to receive the collar of a high-topped canvas shoe, and in particular, to support the natural curvature of the collar, which typically has an extra internally stitched surface/padding for supporting a user's ankle, for example. The recesses 350 may thus maintain the surface of the collar leveled for allowing an even printing on the collar surface, as an example. As such, when one or two high-topped canvas shoes are placed onto the main plate 307 and stretched, in the manner described previously above when referring to FIG. 2, the surface of the collar may be pressed flush against the recess 350, such that, if desired, the surface of the collar may also be digitally printed on, as an example. Thus, the shoe platen may enable the stretching and flattening of various types of canvas shoes, including low-top and high-top canvas shoes, as an advantage.

Figure 4:
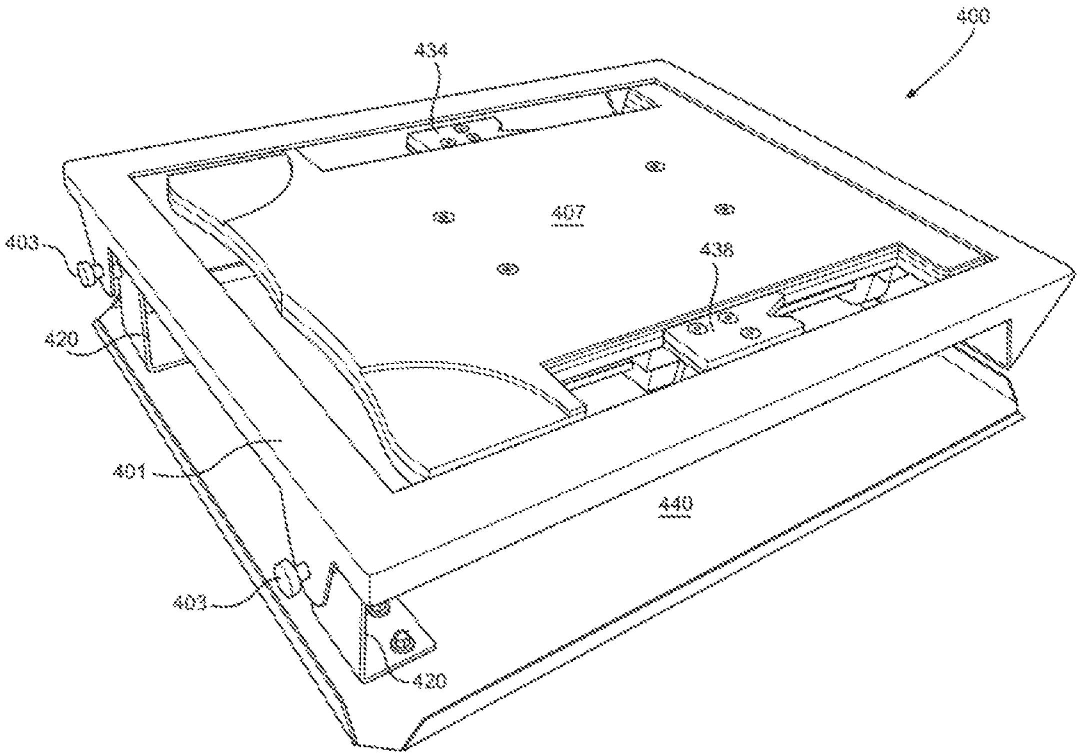
FIG. 4 illustrates a perspective view of the electronic shoe platen of FIG. 1, shown in a closed state, according to an aspect.

FIG. 4 illustrates a perspective view of the electronic shoe platen 100 of FIG. 1, shown in a closed state, according to an aspect. As shown in FIG. 4, the top frame 401 may be selectively closed, such as during operation of the shoe platen 400, for example. As shown, when closed, the top frame 401 abuts the L brackets 420 disposed on the base 440. The top frame 401 may then be secured to the L brackets 420 via pins 403, as shown, as an added safety measure, for example. As shown by the view of FIG. 4, when the shoe platen 400 is in a closed state, the top frame 401 creates an outer border/perimeter around the main plate 407 and side arms 434 and 438, which may thus provide security to a pair of canvas shoes placed on the main plate 407, which will be described in more detail below.

FIG. 5 illustrates a perspective view of an exemplary use of the electronic shoe platen 100 of FIG. 1, in stretching an exemplary pair of canvas shoes 555*a* and 555*b*, according to an aspect. As described throughout this disclosure above, the electronic shoe platen 500 may be utilized and implemented in an existing digital printing system for digitally printing directly onto a surface of a pair of existing canvas shoes, for example. In the example shown in FIG. 5, let the electronic shoe platen 500 be used to stretch and flatten a side surface 556A and 556B of a pair of high-top canvas shoes 555*a* and 555*b*, respectively, for digitally printing onto the side surfaces 556A and 556B by a digital printer 561, which will be described in detail below.

In accordance with an aspect of the current invention, a method of stretching, such that to flatten a surface of, a canvas shoe using the electronic shoe platen by a user 560 is provided. As an example, let the shoe platen 500 initially be in an open state, as shown previously in FIG. 3. As shown in FIG. 5, the pair of canvas shoes 555*a* and 555*b* may then be place onto either side of the main plate 507, such that the inner sole of the heel of each canvas shoe 555*a*, 555*b* abuts and partially envelops the rear block (242 in FIG. 2) and contacts the curved groove (243) disposed at the second end of the plate 507, and such that the toe cap (depending on the size of the shoe) at least partially contacts the frontal block (241 in FIG. 2), as an example. The position of each side arm (234 and 238 in FIG. 2) may be adjusted, as needed, via the external controller (see e.g., 659 in FIG. 6), for example, such that the hook of the side arm engages the lowest portion of the tongue of the canvas shoe 555*a*, 555*b*. Upon engagement, the position of each side arm may further be traversed forward longitudinally, via the external controller, for example, such that to cause a stretching of the surface 556A, 556B of the canvas shoe 555*a*, 555*b*, the curved grooves (243) providing an opposing force against the interior of the heel of each shoe. As shown in FIG. 5, each canvas shoe 555*a*, 555*b* may visually mirror the other when placed onto the main plate 507, as an example. The surfaces 556A and 556B may be continuously stretched by the side arms until the surfaces 556A and 556B are sufficiently flat/taut, as shown in FIG. 5, such that to allow digital printing directly onto the surfaces 556A and 556B. Then, as shown in FIG. 5, the user may secure the top frame 501 over the main plate 507, such that the pins 503 are secured to the L-brackets of the bottom platform (as shown previously in FIG. 4, for example). As illustrated, the frame 501, when closed, firmly abuts the outsoles of both canvas shoes 555*a* and 555*b*, thus securing the canvas shoes 555*a* and 555*b* to the main plate 507, such that the canvas shoes 555*a* and 555*b* are prevented from moving or shifting during the printing process, as an example.

Thus, as outlined by the above-described method steps, a pair of canvas shoes may effectively and easily be stretched, such that to allow a flattened surface of each of the stretched canvas shoes to be digitally printed on. Thus, an advantage is the user-friendly nature of the electronic shoe platen, due to the simplicity of the shoe stretching process using said shoe platen. Another advantage is that the pair of canvas shoes may be protected from damage or mistakes during the printing process, such as mistakes incurred due to a slipping of the shoes during the digital printing process. As mentioned above, following the secure and successful stretching of the canvas shoes 555*a* and 555*b*, the flattened surfaces 556A and 556B, respectively, may simultaneously be digitally printed on by a digital garment printer 561 of the user's choice. As similarly mentioned previously above in the Background, the user 560 may desire to print a logo, design, color pattern, and/or similar graphics onto the surfaces 556A and 556B of the canvas shoes 555*a* and 555*b*, respectively, for the customization, branding and/or personalization of the canvas shoes, as an example. Thus, an advantage of the electronic shoe platen is that a pair of canvas shoes may selectively be simultaneously printed on via a digital garment printer, allowing for the fast and easy customization and personalization of the pair of canvas shoes. It should be noted that, in order to then print on the other side of the canvas shoes 555*a* and 555*b*, the user 560 need only swap the respective placements of the canvas shoes 555*a* and 555*b* on the main plate 507. In other words, to digitally print on the surface opposite those at 556A and 556B, respectively, canvas shoe 555*a* may be placed on the left side of the main plate 507 and canvas shoe 555*b* may be placed on the right side, for example. The above-described method may then be repeated.

Figure 6:
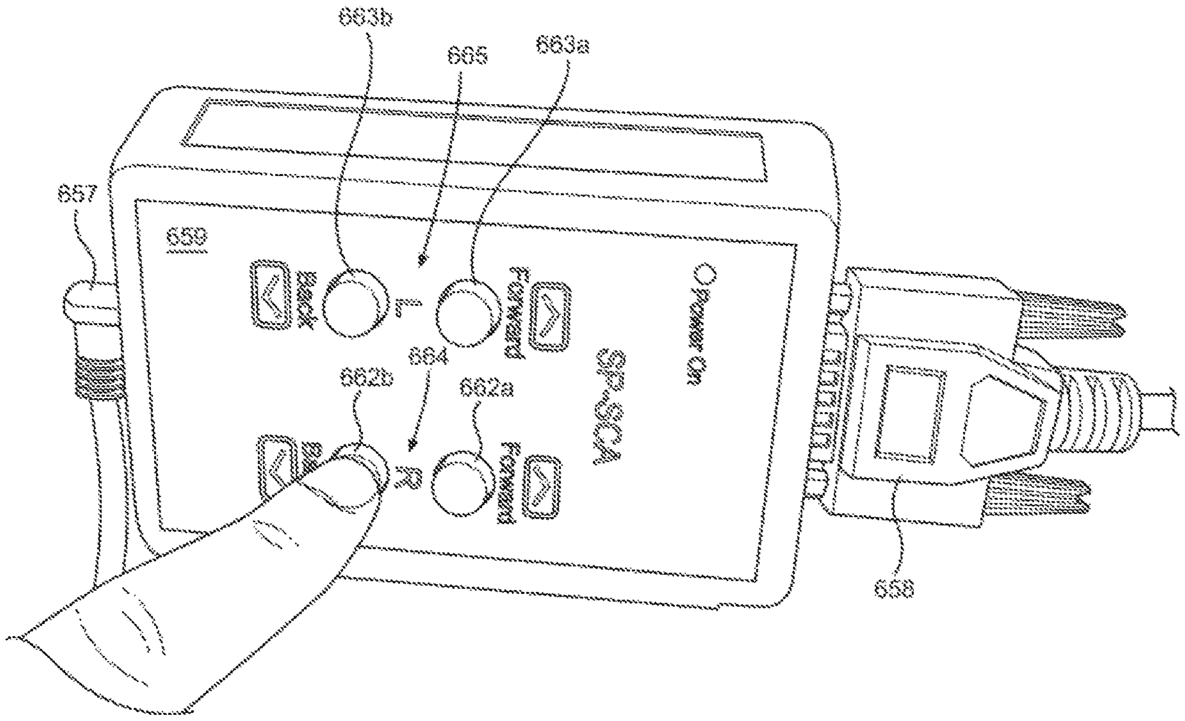
FIG. 6 illustrates a front perspective view of a controller adapted to electrically control the electronic shoe platen of FIG. 1, according to several aspects.

FIG. 6 illustrates a front perspective view of a controller 659 adapted to electrically control the electronic shoe platen 100 of FIG. 1, according to several aspects. As mentioned previously throughout this disclosure above, the electronic shoe platen may be provided with an external controller for electronically controlling the 24V DC motors of the shoe platen, as an example. As will be described in detail below, the controller 659 shown in FIG. 6 may enable a user to easily and efficiently control a movement of the side arms, such that to facilitate stretching of a pair of plate-connected canvas shoes.

As shown in FIG. 6, the controller 659 may be a relatively small, compact device, similar to a remote, for example, for controlling the DC motors of the electronic shoe platen. As shown, the controller 659 may be clearly labeled, employing words, letters, and symbols, for example, such that to enable a user to easily and effectively use the controller 659. As shown as an example, the controller 659 may be divided into two columns of buttons, a first column 665 labeled "L" to represent the left arm (e.g., 334 in FIG. 3), and a second column 664 labeled "R" to represent the right arm (e.g., 338 in FIG. 3). The first column 665 may be provided with a first button 663*a*, labeled "Forward," and provided with an upward-facing arrow, as shown, representing a forward longitudinal motion of the left arm (e.g., 334), as an example. As such, upon engagement of the first button 663*a*, a first DC motor of the pair of DC motors (e.g., 114 in FIG. 1) may cause a rotation of the motor's rotor shaft (114A), for example, in a first direction (e.g., clockwise), which, as discussed previously when referring to FIG. 2, may cause the left arm (e.g., 234 in FIG. 2) to traverse forward longitudinally. Additionally, as shown in FIG. 6, the first column 665 may also be provided with a second button 663*b*, labeled "Back," and provided with a downward-facing arrow, as shown, representing a reverse/backward longitudinal motion of the left arm (e.g., 334). As such, upon engagement of the second button 663*b*, the first DC motor of the pair of DC motors (e.g., 114 in FIG. 1) may cause a rotation of the motor's rotor shaft, for example, in a second direction (e.g., counterclockwise), which, as discussed previously when referring to FIG. 2, may cause the left arm (e.g., 234 in FIG. 2) to traverse backward longitudinally.

Referring now to the second column 664, the second column 664 may be provided with a first button 662*a*, labeled "Forward," and provided with an upward-facing arrow, as shown, representing a forward longitudinal motion of the right arm (e.g., 338 in FIG. 3). As such, upon engagement of the first button 662*a*, a second DC motor of the pair of DC motors (e.g., 114 in FIG. 1) may cause a rotation of the motor's rotor shaft, for example, in a first direction (e.g., clockwise), which, as discussed previously when referring to FIG. 2, may cause the right arm (e.g., 238 in FIG. 2) to traverse forward longitudinally. Additionally, as shown in FIG. 6, the second column 664 may also be provided with a second button 662*b* labeled "Back," and provided with a downward-facing arrow, as shown, representing a reverse/backward longitudinal motion of the right arm (e.g., 338). As such, upon engagement of the second button 662*b*, the second DC motor of the pair of DC motors (e.g., 114 in FIG. 1) may cause a rotation of the motor's rotor shaft, for example, in a second direction (e.g., counterclockwise), which, as discussed previously when referring to FIG. 2, may cause the right arm (e.g., 238 in FIG. 2) to traverse backward longitudinally. Thus, as outlined above, the controller 659 may allow a user to easily and efficiently selectively control the directions of movement of the left and the right arms, such that to stretch a surface of a pair of canvas shoes for digital printing onto the surfaces, as an example. Thus, an advantage of the disclosed shoe platen is that the controller may allow a user to intuitively and selectively control the various operations of the shoe platen.

As an example, the controller 659 may comprise an internal 125V AC controller printed circuit board (PCB) (see e.g., 770 in FIG. 7) powered by exemplary power cord 657 (plugged into a typical wall socket, for example). The controller 659 may thus comprise a power button or switch (not shown), for example, for providing power to the controller PCB (as indicated by the label "Power On"). As shown in FIG. 6, the controller 659 may be provided with a removable electrical cable 658 (e.g., a VGA 15 pin cable) electrically connected to the electronic shoe platen. For example, the electrical cable 658 may be electrically connected to a bottom port at the rear end of the main plate, such that to electrically contact the pair of DC motors. As such, the control signals may be transmitted to the electronic shoe platen via the electrical cable 658 for controlling of the DC motors, as discussed previously above. However, it should be understood that the controller 659 may be configured to utilize various types of cables, such as multiple types of USB cables, for example. Furthermore, the controller 659 may be adapted to communicate wirelessly with the electronic shoe platen, using data transmitters and receivers, for example, to exchange control signals via Wi-Fi or Bluetooth®, for example.

Figure 7:
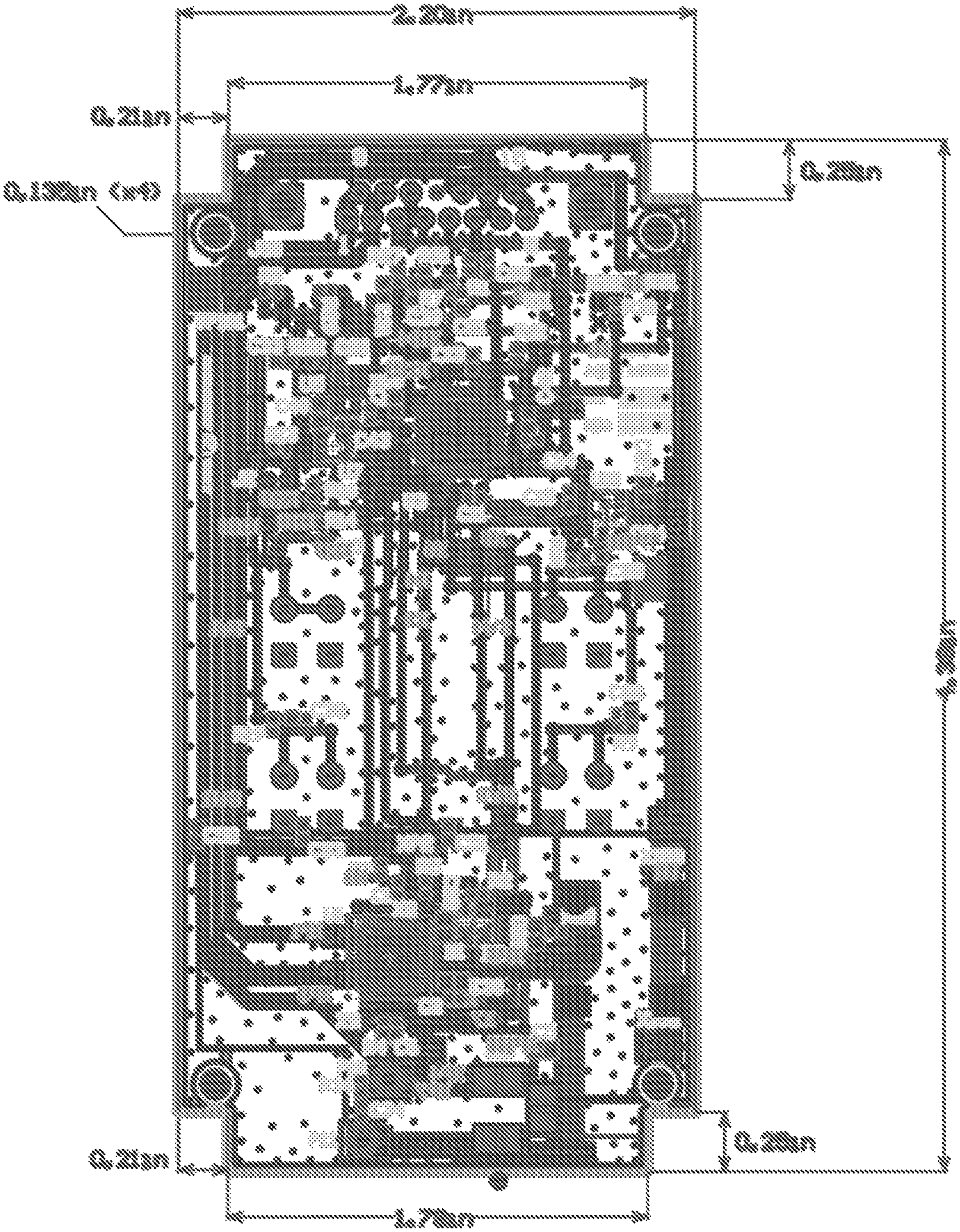
FIG. 7 is a schematic illustrating a top view of an internal printed circuit board of the controller of FIG. 6, according to an aspect.

FIG. 7 is a schematic illustrating a top view of an internal printed circuit board 770 of the controller 659 of FIG. 6, according to an aspect. As similarly mentioned previously above when referring to FIG. 6, the PCB 770 of the controller 659 may be particularly adapted for causing independent rotations of the rotary shaft of each DC motor of the pair of DC motors. As will be discussed in greater detail when referring to FIGS. 8A-8B below, the controller PCB 770 may be adapted to convert and subsequently transmit control signals, received via the sets of buttons (e.g., 663*a-b* and 662*a-b*), for example, to the electronic shoe platen to cause a rotation of each DC motor of the pair of DC motors in a user-specified direction. As shown, the PCB 770 may be provided with a plurality of exemplary on-chip electrical components, such as resistors, capacitors, solder masks, PCB traces for electrically integrating and connecting said components, and the like. The PCB 770 may also be provided with an on-chip microprocessor, for example, pre-programmed for responding to user input (e.g., button presses). As an example, the PCB 770 shown in FIG. 7 may be fabricated using green, glass-reinforced epoxy laminate material having an immersion gold finish. It should be understood that the board dimensions shown in FIG. 7 are provided as examples and that the dimensions of the PCB 770 may be larger or smaller, as needed.

Figure 8A:
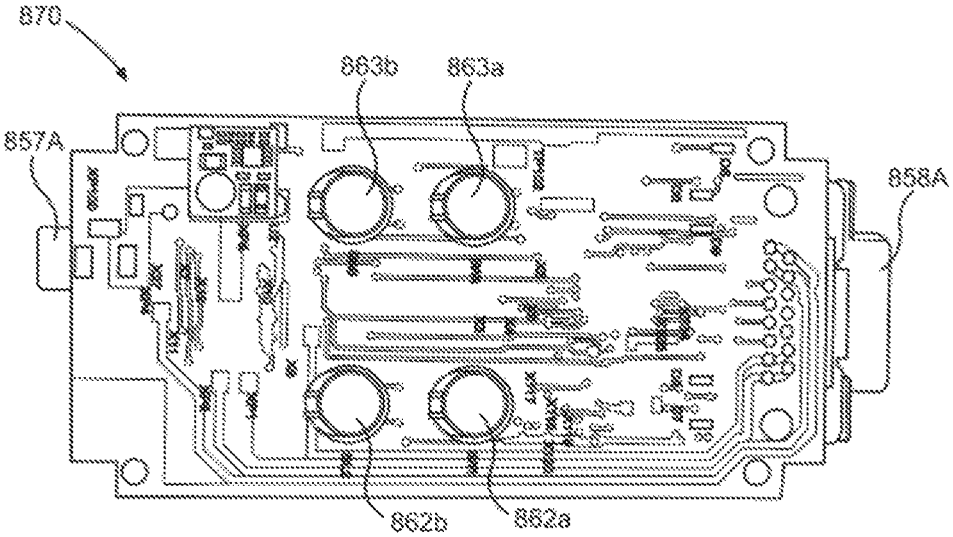
FIGS. 8A-8B illustrate top and bottom views, respectively, of the internal printed circuit board of FIG. 7, associated with the controller of FIG. 6, according to an aspect.
Figure 8B:
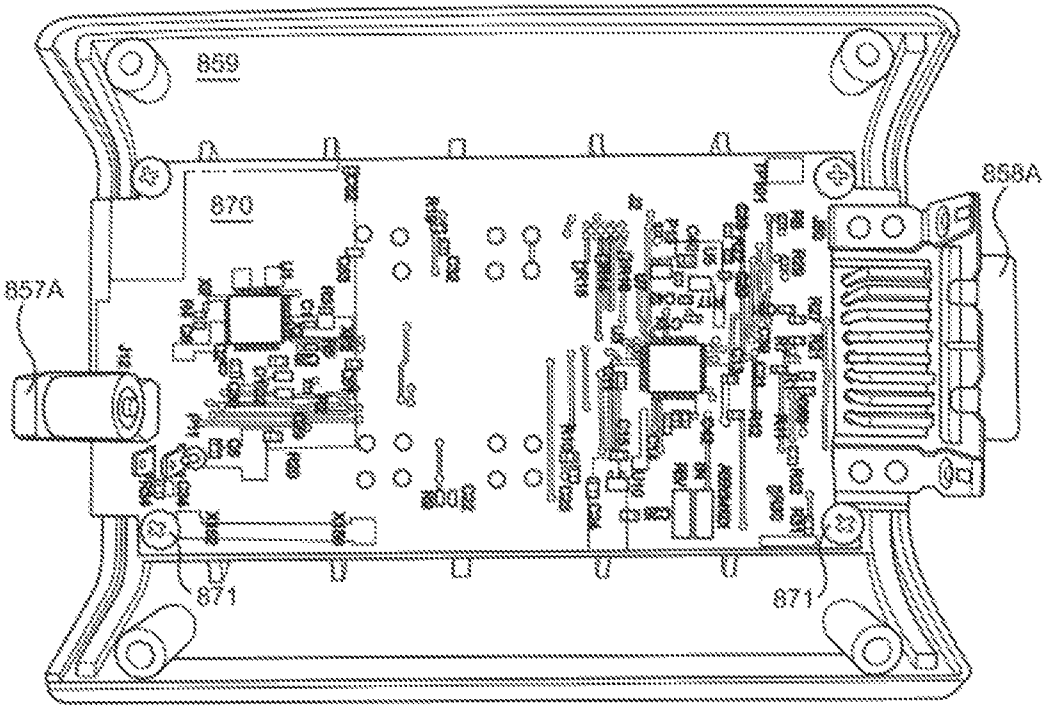

FIGS. 8A-8B illustrate top and bottom views, respectively, of the internal printed circuit board 770 of FIG. 7, associated with the controller 659 of FIG. 6, according to an aspect. As mentioned previously above, the PCB 870 may be particularly designed and provided within the controller to allow a user to easily and effectively control the movement of the left and right arms of the electronic shoe platen. As will be discussed in detail below, the controller PCB 870 may convert digital signals into mechanical motion for stretching a pair of canvas shoes.

As shown in FIG. 8A, the controller PCB 870 may electrically connect to the sets of buttons 863*a-b* and 862*a-b*, described previously when referring to FIG. 6 above. As similarly described previously when referring to FIG. 6 above, the left set of buttons 863*a* and 863*b* may allow a user to cause a forward or backward longitudinal movement, respectively, of the left arm (e.g., 334 in FIG. 3) by controlling the direction of rotation of the rotary shaft of a first DC motor of the pair of DC motors. As such, upon pressing/pushing of either the first button 863*a* or the second button 863*b*, the controller PCB 870 transmits an electrical control signal to the first DC motor via a serial port 858A. The electrical cable 658 shown previously in FIG. 6 may be electrically connected to the serial port 858A, thus allowing the electrical control signal to selectively cause a rotation of the rotary shaft, as desired. Similarly, as an example, the right set of buttons 862*a* and 862*b* may allow a user to cause a forward or backward longitudinal movement, respectively, of the right arm (e.g., 338 in FIG. 3) by controlling the direction of rotation of the rotary shaft of a second DC motor of the pair of DC motors. As such, upon pressing/pushing of either the first button 862*a* or the second button 862*b*, the controller PCB 870 transmits an electrical control signal to the second DC motor via the serial port 858A and the electrical cable (658), thus allowing the electrical control signal to selectively cause a rotation of the rotary shaft, as desired. Thus, as outlined above, the controller PCB 870 may convert the physical push of a button to the mechanical rotation of the rotary shaft of a DC motor, such that to cause the traversal of the side arms. Thus, an advantage is that the DC motors of the shoe platen may be individually controlled, such that the longitudinal motions of the side arms may thus be individually controlled.

As shown in FIG. 8B, the PCB 870 may be securely placed and fit within the controller 859, such that the PCB 870 may be protected from potential damage, such as water damage, ink damage, dirt, etc., for example. As shown, the PCB 870 may be secured to the controller 859 via exemplary mounting screws 871 screwed into each corner of the PCB 870, as an example. The PCB 870 may also be provided with a solder-mounted power jack 857A, as shown, configured to electrically connect to the power cord (e.g., 657 in FIG. 6) for providing power to the controller PCB 870, for example. The controller 859 may be constructed of any suitably durable and protective material, such as, for example, plastic, silicon, etc., as an example.

It should be understood that the functionality of the controller 659 may be digitally provided, for example, in a software application operating on a mobile device, tablet, laptop, or desktop computer, for example. It should also be understood that the controller depicted in FIG. 6 is exemplary and that various styles, designs, and embodiments of controllers may alternatively be used to control the movements of the electronic shoe platen side arms. It should also be understood that the controller may be adapted to be battery-powered, using disposable or rechargeable batteries, for example. It should also be understood that the electronic shoe platen disclosed herein may be used to print onto other related garment surfaces, not solely just the surfaces of canvas shoes, such as, for example, gloves, hats, caps, etc. The electronic shoe platen, including each of the exemplary robust components (e.g., main plate, side arms, top frame, screws, etc.) shown and described herein, may be constructed of any suitably strong and durable material, such as metals including aluminum, steel, iron, silver, titanium, etc. It should be understood that the V-shaped hook of each side arm can be provided as any suitable shape capable of gripping an interior of a canvas shoe, such as, for example, a U-shape, wedge-shape, etc.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A system for stretching a surface of a shoe for digitally printing onto the surface by an external device, the system comprising an apparatus and a controller being in electrical communication with the apparatus, the apparatus comprising:

- a main plate configured to receive and provide support for the shoe;
- a side arm associated with the main plate, the side arm being adapted to traverse longitudinally along an edge of a medial portion of the main plate and being configured to engage with at least a portion of the tongue of the shoe; and
- a driver configured to cause the longitudinal traversal of the side arm, the driver having:
  - an end bearing and an adjacent end connector disposed beneath the main plate;
  - a rotary band attached to and extending between the end bearing and the end connector;
  - an end bracket disposed opposite the end bearing and beneath the main plate;
  - a driving screw extending between the end bracket and the end bearing, the driving screw being associated with the side arm; and
  - a motor associated with the end connector, the motor being adapted to receive an electrical signal from the controller, the electrical signal selectively causing a rotation of a rotary shaft of the motor.

2. The system of claim 1, wherein the main plate further comprises:

- a front end and a rear end opposite the front end, the medial portion extending between the front and the rear ends, the medial portion being laterally offset from an outer edge of each of the front and the rear ends;
- the rear end being adapted to receive and provide support for an interior of the heel of the shoe;
- the system being thus adapted such that when the shoe is received by the main plate, and when the electrical signal is received by the motor, the rotary shaft is caused to rotate the end connector, such that the end bearing is caused to rotate via the rotary band, the rotating of the end bearing causing a rotation of the driving screw, and thus causing the side arm to traverse longitudinally to engage with at least a portion of the tongue of the shoe, such that to cause a stretching of a surface of the shoe, and thus enabling direct digital printing onto the surface by the external device.

3. The system of claim 2, wherein the main plate further comprises a curved groove disposed at the rear end, the curved groove being adapted to receive and provide support for the interior of the heel of the shoe.

4. The system of claim 2, wherein the driver further comprises:

- a driving rail connected below the main plate, the driving rail being aligned to a bottom of the edge of the middle portion of the main plate;
- a base plate connected below and configured to support the side arm;
- a driving block connected to the base plate;
- wherein the driving screw is threaded through a center of the driving block; and
- a driving guide connected above the driving block, the driving guide being slidably engaged with the driving rail;
- wherein a rotation of the rotary shaft of the motor causes a rotation of the end connector, which causes a rotation of the end bearing via the rotary band, and thus causes a rotation of the driving screw, resulting in a longitudinal traversal of the driving block, and thus, the longitudinal traversal of the side arm.

5. The system of claim 1, wherein the controller comprises:

- an internal 125-Volt AC printed circuit board (PCB) adapted to transmit the electrical signals to the pair of motors via an electrical cable, the electrical cable being electrically connected to a portion of the apparatus; and
- a first and a second sets of buttons adapted to be selectively pressed, the pressing of the first and the second sets of buttons causing a transmitting of the electrical signals by the PCB.

6. The system of claim 1, wherein the side arm comprises a V-shaped groove for engaging with the at least a portion of the tongue of the shoe.

7. The system of claim 1, wherein the external device is a digital garment printer.

* * * * *